United States Patent [19]
Hammer et al.

[11] Patent Number: 6,051,930
[45] Date of Patent: Apr. 18, 2000

[54] EXTENDED WIRE CONNECTOR FOR STARTING COMPACT FLUORESCENT LAMP SYSTEM

[75] Inventors: Edward E. Hammer, Mayfield Village; Alvin A. Bush, South Euclid, both of Ohio

[73] Assignee: General Electric Company, Schenectady, N.Y.

[21] Appl. No.: 09/053,312

[22] Filed: Apr. 1, 1998

[51] Int. Cl.$^7$ ...................................................... H01J 7/44
[52] U.S. Cl. ...................... 315/58; 315/101; 315/209 R; 315/291; 313/584
[58] Field of Search ................................. 315/56, 58, 70, 315/71, 101, 209 R, 291; 313/567, 584, 622

[56] References Cited

U.S. PATENT DOCUMENTS

| | | | |
|---|---|---|---|
| 4,337,414 | 6/1982 | Young | 315/56 |
| 4,445,074 | 4/1984 | Watanabe | 315/205 |
| 4,484,108 | 11/1984 | Stupp et al. | 315/219 |
| 4,546,290 | 10/1985 | Kerekes | 315/209 R |
| 4,588,925 | 5/1986 | Fähnrich et al. | 315/101 |
| 4,647,820 | 3/1987 | Chermin et al. | 315/245 |
| 5,023,516 | 6/1991 | Ito et al. | 315/101 |
| 5,138,235 | 8/1992 | Sun et al. | 315/209 R |
| 5,262,699 | 11/1993 | Sun et al. | 315/209 R |
| 5,455,484 | 10/1995 | Maya et al. | 315/58 |
| 5,506,474 | 4/1996 | Hammer et al. | 315/56 |
| 5,512,799 | 4/1996 | Waymouth | 313/567 |
| 5,675,215 | 10/1997 | Watson et al. | 313/493 |
| 5,703,440 | 12/1997 | Kachmarik et al. | 315/56 |
| 5,751,104 | 5/1998 | Soules et al. | 313/493 |

*Primary Examiner*—Haissa Philogene
*Attorney, Agent, or Firm*—Fay, Sharpe, Fagan, Minnich & McKee, LLP

[57] ABSTRACT

A compact fluorescent lamp system includes a housing. An external base connector is mounted in the housing. The external base connector receives electrical power from an external source. A ballast unit is secured within the housing and electrically connected to the external base connector. The ballast unit controls the electrical power received from the external source. The compact fluorescent lamp system also includes a lamp unit. The lamp unit includes an amalgam ball pellet within the lamp unit, first and second lamp electrodes extending into the lamp unit, and a gas which breaks-down, permitting an electrical current to pass through the lamp unit. An inside wall of the lamp unit is coated with a material which fluoresces when the gas within the sealed lamp unit ionizes. The lamp unit also includes an extended wire connection having a first end electrically connected to one of the first and second lamp electrodes and a second end located near another point on the lamp unit. A breakdown voltage path within the lamp unit is favorably modified by the extended wire connection.

20 Claims, 7 Drawing Sheets

EXTENDED WIRE CONNECTOR FOR STARTING COMPACT FLUORESCENT LAMP SYSTEM

BACKGROUND OF THE INVENTION

The present invention relates to compact fluorescent lamp systems. It finds particular application in conjunction with starting compact fluorescent lamp systems having high frequency electronic ballast units and will be described with particular reference thereto. It will be appreciated, however, that the invention will also find application in starting other lamp systems.

Many compact florescent lamp systems include a sealed, gas-filled lamp having multiple fingers. A gas filling of Argon at approximately 3 Torr coupled with a sufficient quantity of mercury, for example, is commonly used. An inner wall of the lamp is coated with a material (e.g., a mixture of phosphors) which fluoresces when it is bombarded by ultraholes radiation generated when the gas within the lamp is ionized The fingers of a compact fluorescent lamp are typically formed from several U-shaped tubes. Bridges (i.e., passageways) connect all but two ends of adjacent tubes thereby forming a lamp having a hexagonal or octagonal geometry. Lamp electrodes are sealed into the unconnected adjacent ends. Each lamp electrode provides an electrical path into the lamp. Conducting electrodes from a high-frequency ballast unit are secured to the lamp electrodes. When a starting voltage is delivered from the ballast unit to the conducting electrodes, that voltage is transferred to the interior of the lamp via the lamp electrodes. The starting voltage creates electromagnetic fields within the lamp which create a breakdown voltage path and a current within the tubes. The voltage potential within the tubes breaks-down (i.e., ionizes) the gas. Once the mercury atoms are ionized, and a threshold number of ions are produced, the lamp will start and the coating material within the lamp begins to fluoresce.

In its initial state, the gas within the lamp presents a high impedance to the ballast. Therefore, the starting voltage supplied by the ballast must be high enough to overcome this impedance and create an ionized gas capable of supplying the necessary current to operate the lamp. Supplying a starting voltage capable of ionizing enough gas to start the lamp, however, can produce an undesirable side-effect. More specifically, if the two lamp electrodes are in close proximity to one another, a higher starting voltage may occur due to a capacitive breakdown path between the tubes containing the lamp electrodes. When this occurs, not enough discharge current travels within the lamp tubes to start the lamp. These capacitive breakdown paths between the lamp electrodes most often occur when high frequency (e.g., greater than 20 kHz) electronic ballast units are used to control the power supplied to the lamp.

One way to start the compact fluorescent lamp when capacitive displacement current exists between the lamp electrodes is to increase the starting voltage delivered by the ballast unit. Although the displacement current created by the increased starting voltage still exists between the lamp electrodes, more discharge current travels through the lamp tube, thereby permitting the ionized gas to start the lamp. Supplying higher starting voltages to the lamp assembly, however, is undesirable for various reasons. More specifically, these higher voltages can cause additional voltage stresses on the ballast components which, in turn, require more expensive components to withstand these higher starting voltage requirements.

The present invention provides a new and improved apparatus and method which overcomes the above-referenced problems and others.

SUMMARY OF THE INVENTION

A starting circuit for a fluorescent lamp system includes a ballast unit which controls electrical power received from an external power source. A sealed lamp unit is secured to the ballast unit and contains a gas. First and second lamp electrodes are located at respective end points of the lamp unit. The electrodes extend into the sealed lamp unit and are electrically connected to the ballast unit. An extended wire connection has a first end electrically connected to one of the first and second lamp electrodes and a second end located such that a breakdown voltage path within the sealed lamp unit is modified as a function of a position of the extended wire connection.

In accordance with one aspect of the invention, the lamp unit is multi-segmented and one of the segments contains an amalgam ball pellet to control the mercury vapor pressure within the lamp.

In accordance with one aspect of the invention, the two lamp electrodes are located in adjacent tube segments.

In accordance with one aspect of the invention, the termination end of the extended wire connection is located near one end of the tube segment containing the amalgam ball pellet.

In accordance with a more limited aspect of the invention, the extended wire connection also passes by the other end of the segment containing the amalgam ball pellet.

One advantage of the present invention is that the breakdown voltage potential is distributed more evenly across the lamp, thereby reducing the voltage requirement to actually start the lamp.

Another advantage of the present invention is that a lower voltage is required to start the fluorescent lamp system.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
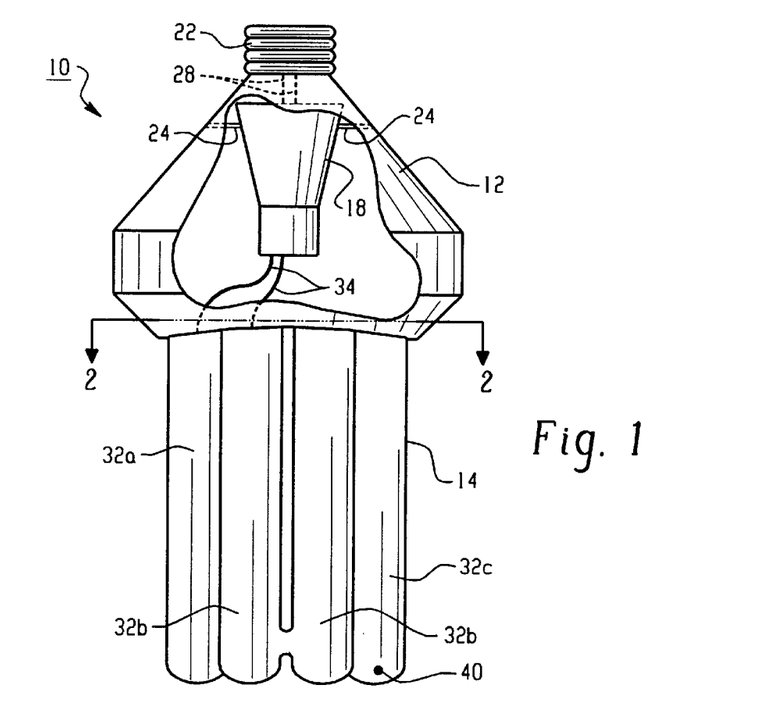
FIG. 1 is a front view of an integral compact fluorescent lamp system including a fluorescent lamp having an octagonal design shape.

FIG. 1 illustrates an integral compact fluorescent lamp system 10. The compact fluorescent lamp system 10 includes a housing 12 and an integral type lamp assembly 14. The housing 12 includes a ballast unit 18 and a connection base 22. Fasteners 24 secure the ballast unit 18 to the housing 12. Preferably, the ballast unit is a high-frequency, electronic ballast unit and the fasteners 24 include plastic segments which protrude from the walls of the housing 12 and attach to the ballast unit 18. However, it is to be understood that other ballast units and other types of fasteners are also contemplated. The connection base 22 is preferably an Edison base as used in threaded incandescent sockets. However, it is also contemplated that the connection base be a pin base, as used in a linear fluorescent lamp, or a bayonet-type base. Wires 28 provide an electrical connection between the connection base 22 and the ballast unit 18.

Figure 2:
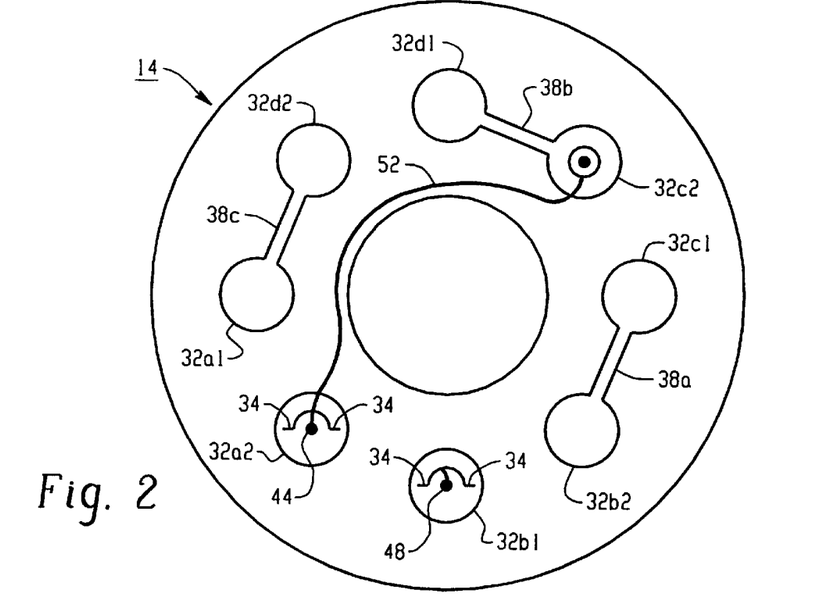
FIG. 2 is a bottom view of the integral lamp assembly taken along the line indicated in FIG. 1.

With reference to FIGS. 1 and 2, the lamp assembly 14 is connected to the ballast unit 18 through electrical connections 34 in the housing 12. The lamp assembly 14 in the preferred embodiment includes four lamp tubes 32a, 32b, 32c, 32d. Each tube is preferably bent into a U-shape. However, other embodiments having different numbers of tubes configured into different shapes are also contemplated. The lamp tube 32a includes tube ends 32a1, 32a2. Similarly, the lamp tubes 32b, 32c, 32d include tube ends 32b1, 32b2; 32c1, 32c2; and 32d1, 32d2, respectively.

The adjacent ends 32b2, 32c1; 32c2, 32d1; and 32d2, 32a1 of the lamp tubes 32a, 32b, 32c, 32d are connected by bridges (i.e., passageways) 38a, 38b, 38c, respectively. More specifically, a bridge (i.e., passageway) 38a connects the adjacent ends 32b2, 32c1 of lamp tubes 32b, 32c, respectively. Similarly, a bridge 38b connects the adjacent ends 32c2, 32d1 of lamp tubes 32c, 32d, respectively, and a bridge 38c connects the adjacent ends 32d2, 32a1 of lamp tubes 32d, 32a, respectively. The adjacent tube ends 32a2, 32b1, which are not connected by a bridge, are sealed. One of the tubes 32c optionally contains an amalgam ball pellet 40.

First and second lamp electrodes 44, 48, respectively, are inserted in respective tube ends 32a2, 32b1. Each lamp electrode 44, 48 includes two metal wires. The lamp electrodes 44, 48 extend into the tube ends 32a2, 32b1, respectively. The electrodes 44, 48 also provide external electrical connection points into the tube ends 32a2, 32b1, respectively. An extended wire connection 52 is electrically connected to one of the wires of the first electrode 44. A termination end of the extended wire 52 is secured to one end (e.g., 32c2) of the tube 32c. If one of the tubes contains an amalgam ball pellet 40, it is preferable to secure the termination end of the extended wire to the end of the tube containing the pellet 40. While the extended wire connection 52 could be connected between a lamp electrode and a tube end which does not contain the amalgam ball pellet, such configurations would produce less optimal results.

In the preferred embodiment, the tube end 32c2 is approximately one-half the distance along the path within the lamp assembly 14 and the extended wire connection 52 is wrapped around the tube end 32c2. An inert gas with a sufficient quantity of mercury is contained within the sealed tubes 32a, 32b, 32c, 32d and bridges 38a, 38b, 38c. Also, the inner wall of each tube 32a, 32b, 32c, 32d is coated with a material (e.g., a mixture of phosphors) which fluoresces when it is excited with ultra-violet radiation produced when the mercury atoms within the lamp assembly 14 are ionized.

During use, electrical power enters the compact fluorescent lamp system 10 through the connection base 22 and is passed to the ballast unit 18 through the wires 28. The ballast unit 18 controls the electrical power received from the connection base 22 and delivers the controlled electrical power to the first and second lamp electrodes 44, 48, respectively, via the electrical connections 34. Once electrical power is supplied to the lamp electrodes 44, 48, electric fields are created within the lamp assembly 14. The extended wire connection 52 adds an additional electrical field point along the path within the lamp assembly 14, thereby modifying the breakdown path of the electrical field. The electrical field permits a current to flow between the lamp electrodes 44, 48 within the lamp assembly 14. The current can flow when the gas within the lamp breaks-down (i.e., ionizes), causing the lamp to start.

As described above, the extended wire connection 52 acts to distribute the voltage supplied by the ballast unit 18 more evenly along the breakdown path within the tubes 32a, 32b, 32c, 32d. Therefore, the voltage potential between the first and second lamp electrodes 44, 48, respectively, is extended to another point within the discharge space. In fact, the voltage potential between the lamp electrodes 44, 48 is reduced such that the probability of the displacement current shorting between the electrodes 44, 48, even when the ballast unit 18 delivers a starting voltage of 900 Volts, is greatly reduced. The capacitive coupling between the lamp electrodes 44, 48 does not occur despite the fact that the electrodes 44, 48 are located in close proximity to one another. Because the displacement current shorts do not occur between the electrodes 44, 48, the lamp tubes 38a, 38b, 38c have a lower starting voltage requirement. Therefore, a sufficient amount of current is delivered along the path inside the tubes 38a, 38b, 38c to start the lamp assembly 14.

Figure 3:
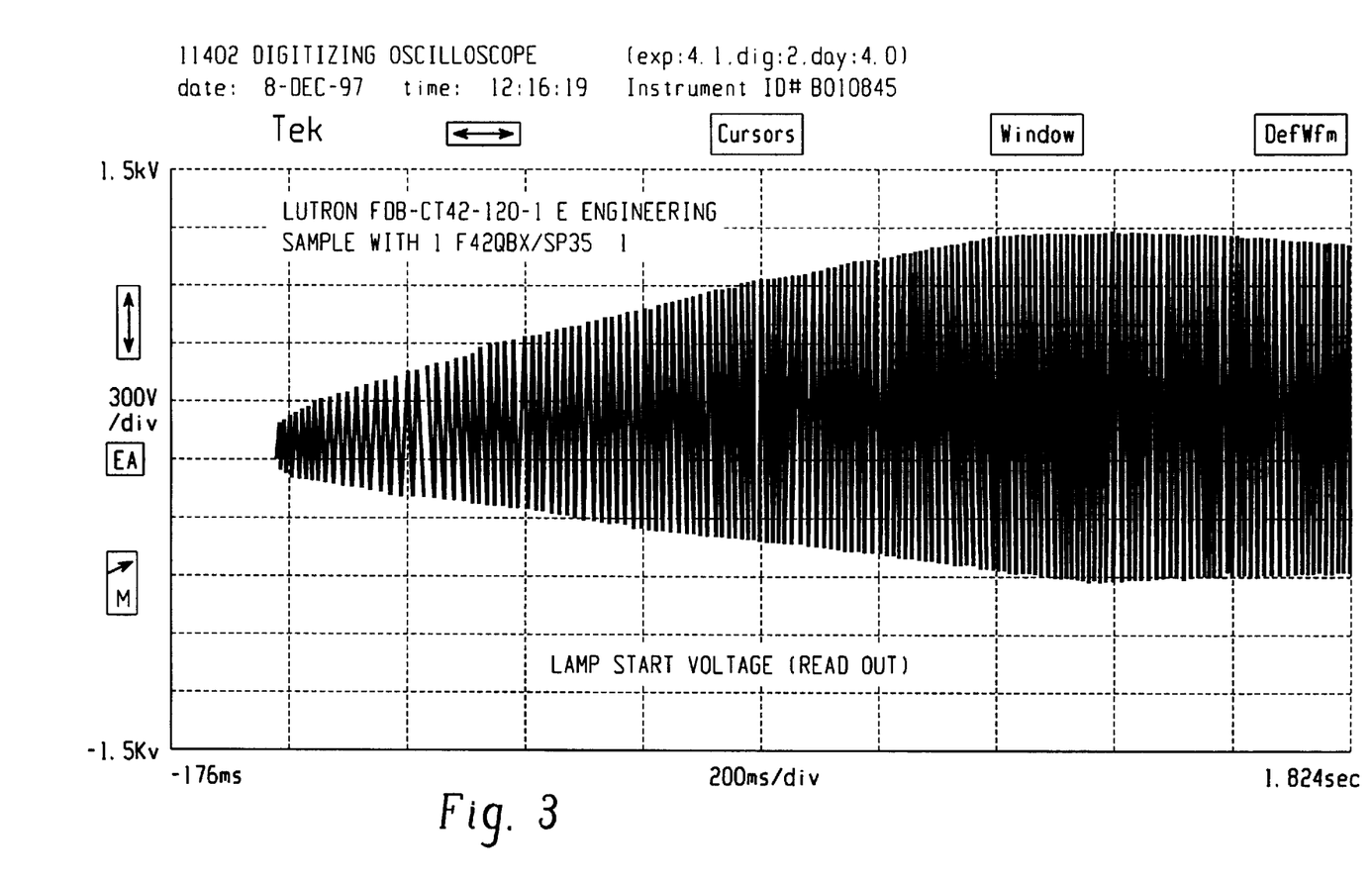
FIG. 3 illustrates a graph showing a lamp start voltage versus time in a lamp without the extended connection wire disclosed in the present invention.
Figure 4:
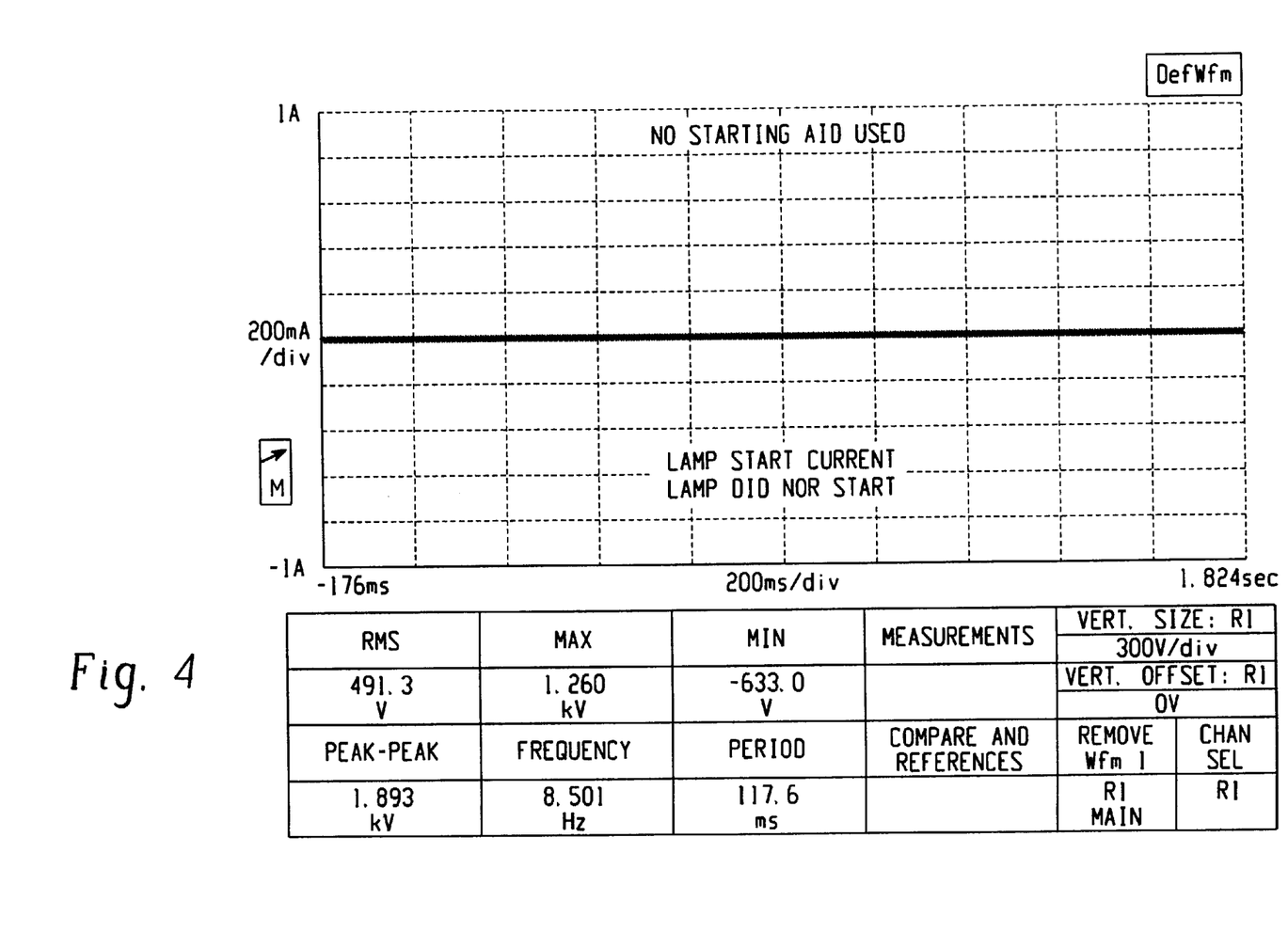
FIG. 4 illustrates a graph showing the unsatisfactory lamp start current for the lamp which generated the graph shown in FIG. 3.
Figure 5:
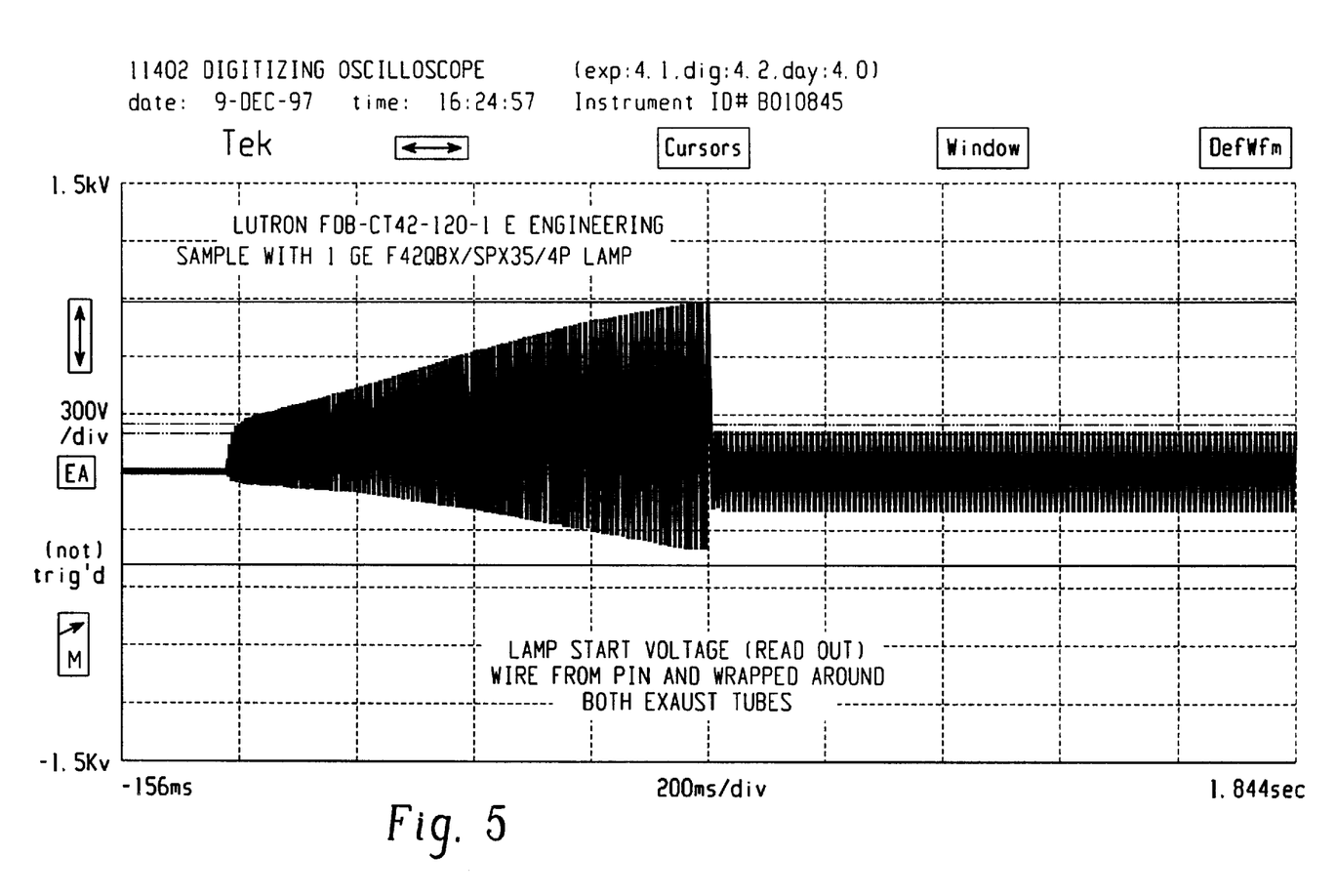
FIG. 5 illustrates a graph showing a lamp start voltage versus time in a lamp having the novel extended wire connection disclosed in the present invention.
Figure 6:
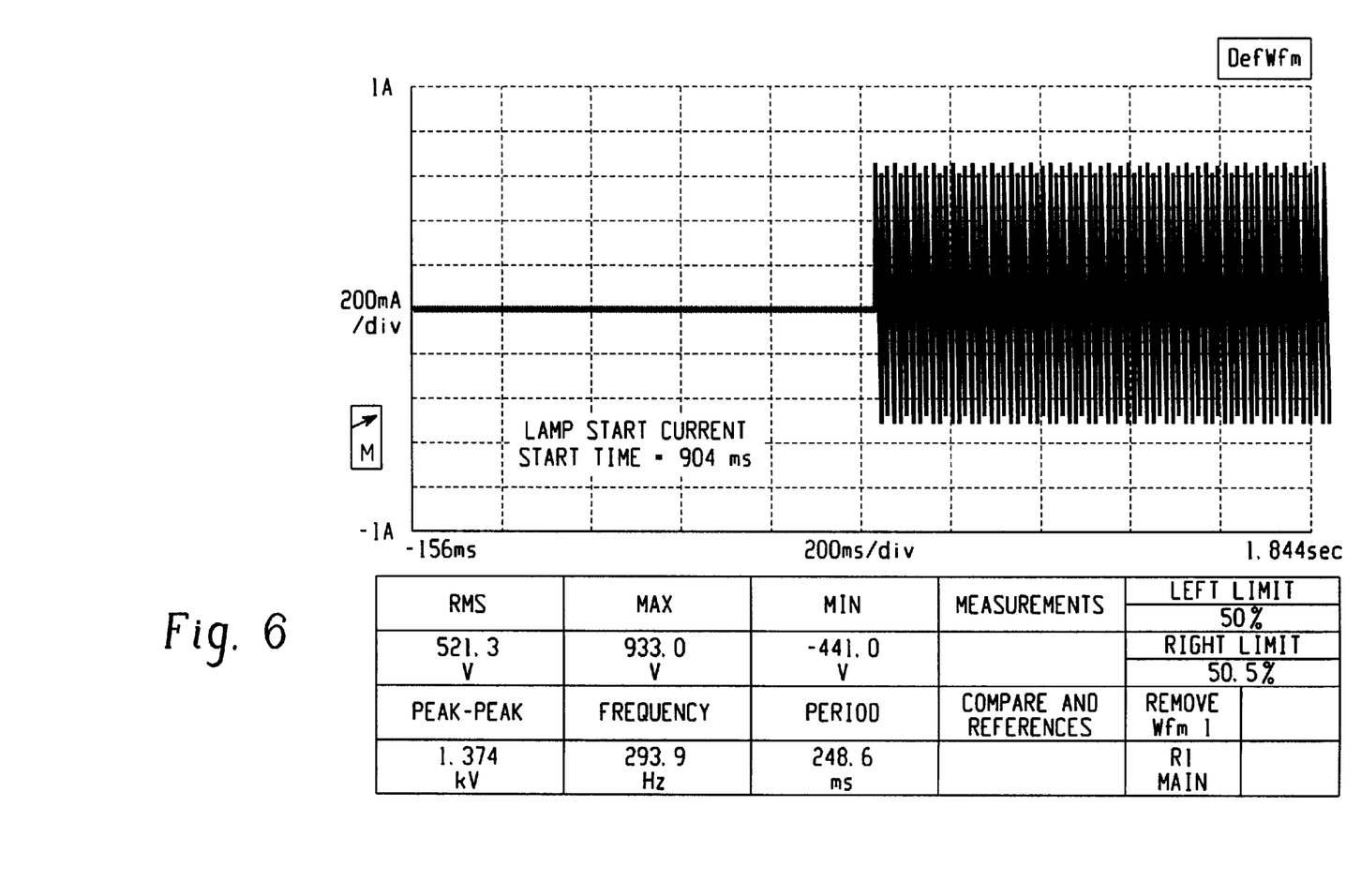
FIG. 6 illustrates a graph showing the satisfactory lamp start current for the lamp which generated the graph shown in FIG. 5.

FIG. 3 illustrates a graph showing a lamp start voltage versus time in a lamp without the extended wire connector disclosed in the present invention. FIG. 4 illustrates a graph showing the lamp start current for the same lamp. FIG. 4 shows the lamp start current is zero (0) even when a starting voltage of 1.2 kV is applied. In other words, FIG. 4 shows the lamp without the extended wire connection of the present invention never starts. FIG. 5 illustrates a graph showing a lamp start voltage versus time in a lamp having the extended wire connection disclosed in the present invention. FIG. 6 illustrates a graph showing the lamp start current for the same lamp. FIG. 6 shows the lamp start current jumps from zero (0) to over 200 mA when 933 Volts is applied (i.e., when the lamp starts). Therefore, a comparison between FIG. 4 and FIG. 6 shows the lamp without the extended wire connection of the present invention fails to start whereas the lamp having an extended wire connection as disclosed in the present invention starts when a reduced starting voltage of 933 Volts is applied.

While the preferred embodiment discloses the extended wire connection being connected between the first lamp electrode 44 and the tube end 32c2, it is also contemplated that the extended wire connection 52 be connected between the fist lamp electrode 44 and another tube end.

Figure 7:
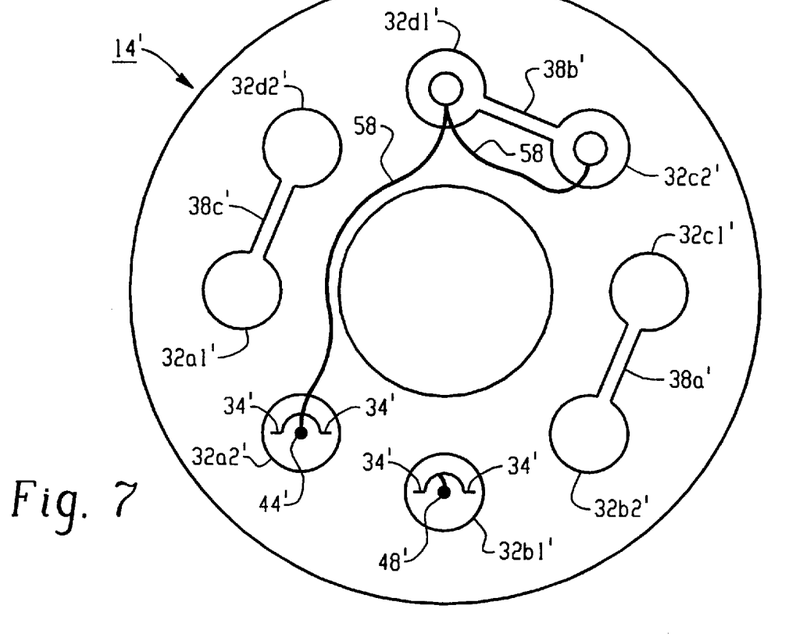
FIG. 7 is a bottom view of an integral type fluorescent lamp assembly in a second embodiment of the present invention.

FIG. 7 illustrates a lamp assembly in a second embodiment of the present invention. For ease of understanding this embodiment, like components are designated by like numerals with a primed (') suffix and new components are designated by new numerals. FIG. 7 illustrates an extended wire connection 58 connected between a wire of the first lamp electrode 44' and the tube ends 32c2', 32d1'. Therefore, the extended wire connection 58 adds an additional electrical field point along the path within the lamp assembly 14' than what is disclosed in FIG. 2. In this manner, the breakdown path of the electrical field is modified even more than it is in the embodiment shown in FIG. 2.

While the embodiment disclosed in FIG. 7 includes an extended wire connection electrically connected between the first lamp electrode 44' and the tube ends 32c2', 32d1', it is to be understood that other connection configurations for the extended wire connection are also contemplated.

Figure 8:
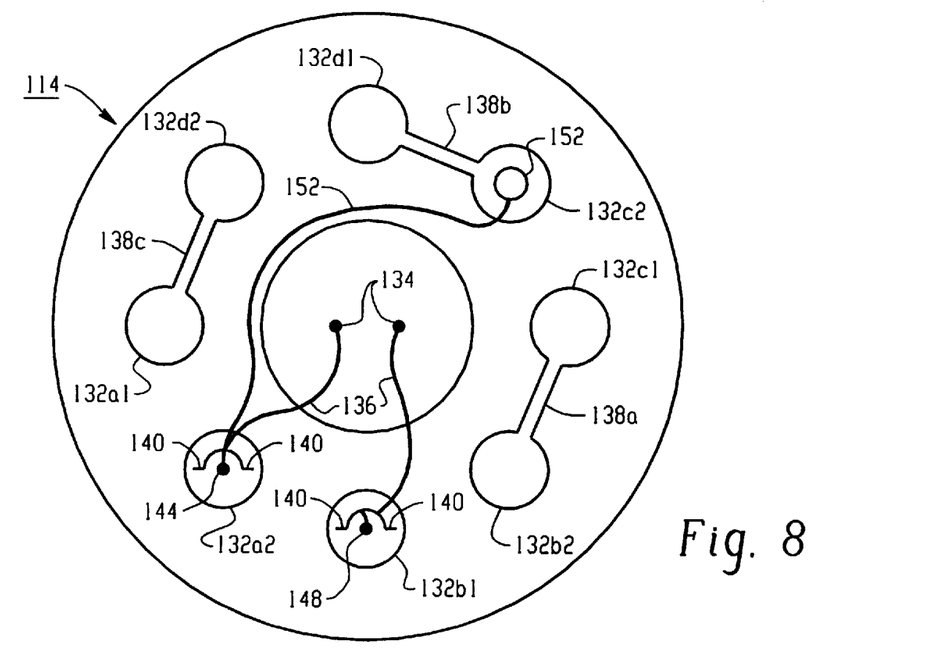
FIG. 8 is a bottom view of a plug-in type fluorescent lamp assembly in a third embodiment of the present invention.

FIG. 8 illustrates a plug-in type lamp assembly 114 in a third embodiment of the present invention. For ease of understanding this embodiment, like components are designated by like numerals preceded by a one (1) and new components are designated by new numerals. As in the first two embodiments, the lamp assembly 114 in this embodiment includes four lamp tubes 132a, 132b, 132c, 132d bent into a U-shape. It is to be understood that other embodiments having different numbers of tubes configured into different shapes are also contemplated. The lamp tube 132a includes tube ends 132a1, 132a2. Similarly, the lamp tubes 132b, 132c, 132d include tube ends 132b1, 132b2; 132c1, 132c2; and 132d1, 132d2, respectively. Pins 134, which plug into a housing containing a ballast unit, extend from the lamp assembly 114.

The adjacent ends 132b2, 132c1; 132c2, 132d1; and 132d2, 132a1 of the lamp tubes 132a, 132b, 132c, 132d are connected by bridges (i.e., passageways) 138a, 138b, 138c, respectively. More specifically, a bridge 138a connects the adjacent ends 132b2, 132c1 of lamp tubes 132b, 132c, respectively. Similarly, a bridge 138b connects the adjacent ends 132c2, 132d1 of lamp tubes 132c, 132d, respectively, and a bridge 138c connects the adjacent ends 132d2, 132a1 of lamp tubes 132d, 132a, respectively. The adjacent tube ends 132a2, 132b1, which are not connected by a bridge, are sealed. First and second lamp electrodes 144, 148, respectively, are sealed into respective tube ends 132a2, 132b1. The lamp electrodes 144, 148 extend into the tube ends 132a1, 132b1, respectively. The electrodes 144, 148 also provide external electrical connection points into the tube ends 132a2, 132b1, respectively. As in the first embodiment, a gas fills the sealed tubes 132a, 132b, 132c, 132d and bridges 138a, 138b, 138c. Also, the inner wall of each tube 132a, 132b, 132c, 132d is coated with a material (e.g., a mixture of phosphors) which fluoresces when it is bombarded with ions produced when the gas within the lamp assembly 114 is ionized. Pins 134, which plug into a housing containing a ballast unit, extend from the lamp assembly 114.

During use, electrical power enters the lamp assembly 114 through the pins 134. The pins 134 are electrically connected to electrical connectors 140 on the first and second lamp electrodes 144, 148, respectively, through wires 136. A first end of an extended wire connection 152 is electrically connected to the first lamp electrode 144. A termination end of the extended wire connection 152 is wrapped around the tube end 132c2. As in the first embodiment, the extended wire connection 152 adds an additional electrical field point along the path within the lamp assembly 114, thereby modifying the breakdown path of the electrical field. The operation and benefits of the plug-in type lamp assembly 114 disclosed in FIG. 8 are similar to the integral type lamp assembly shown in FIG. 2.

Figure 9:
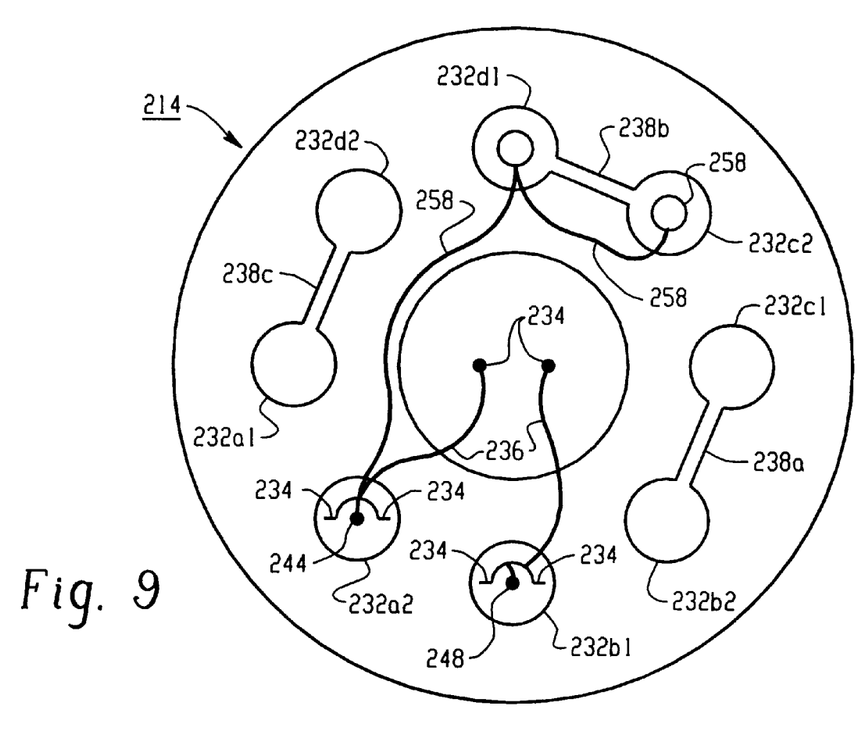
FIG. 9 is a bottom view of a plug-in type fluorescent lamp assembly in a fourth embodiment of the present invention.

FIG. 9 illustrates a plug-in type lamp assembly 214 in a fourth embodiment of the present invention. For ease of understanding this embodiment, like components are designated by like numerals preceded by a two (2) and new components are designated by new numerals. Like the first three embodiments, the lamp assembly 214 in this embodiment includes four lamp tubes 232a, 232b, 232c, 232d bent into a U-shape. The lamp tube 232a includes tube ends 232a1, 232a2. Similarly, the lamp tubes 232b, 232c, 232d include tube ends 232b1, 232b2; 232c1, 232c2; and 232d1, 232d2, respectively. The adjacent ends 232b2, 232c1; 232c2, 232d1; and 232d2, 232a1 of the lamp tubes 232a, 232b, 232c, 232d are connected by bridges (i.e., passageways) 238a, 238b, 238c, respectively. The adjacent tube ends 232a2, 232b1, which are not connected by a bridge, are sealed.

First and second lamp electrodes 244, 248, respectively, are inserted through respective tube ends 232a2, 232b1. FIG. 9 illustrates an extended wire connection 258 having a first end electrically connected to a wire of the first lamp electrode 244. A termination end of the extended wire connection 258 is wrapped around the tube end 232d1. A middle portion of the extended wire connection 258 is also wrapped around the tube end 232d1. Therefore, the extended wire connection 258 adds an additional electrical field point, along the path within the lamp assembly 214, than what is disclosed in FIG. 8. In this manner, the breakdown path of the electrical field is modified even more than it is in the embodiment shown in FIG. 8.

While the embodiment disclosed in FIG. 9 includes an extended wire connection between the first lamp electrode 244 and the tube ends 232c2, 232d1, it is to be understood that other connection configurations for the extended wire connection are also contemplated.

The operation and benefits of the plug-in type lamp assembly 214 disclosed in FIG. 9 are similar to the integral type lamp assembly shown in FIG. 7.

The invention has been described with reference to several embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A starting circuit for a fluorescent lamp system, the starting circuit comprising:

a ballast unit which controls electrical power received from an external power source;

a sealed lamp unit secured to the ballast unit, the sealed lamp unit containing a gas;

first and second lamp electrodes located at respective end points of the lamp unit, the electrodes extending into the sealed lamp unit and being electrically connected to the ballast unit; and an extended wire connection having a first end electrically connected to one of the first and second lamp electrodes and a second end located such that a breakdown voltage path within the sealed lamp unit is modified as a function of a position of the extended wire connection.

2. The starting circuit as set forth in claim 1, wherein:
the gas is an inert gas; and
the sealed lamp unit also contains mercury.

3. The starting circuit as set forth in claim 1, wherein:
the sealed lamp unit is multi-segmented; and
the sealed lamp unit is substantially circular.

4. The starting circuit as set forth in claim 3, wherein the two lamp electrodes are located in adjacent segments.

5. The starting circuit as set forth in claim 4, wherein the sealed lamp includes eight segments.

6. The starting circuit as set forth in claim 3, wherein:
one of the segments contains an amalgam ball pellet; and
the second end of the extended wire connection is secured to the segment containing the amalgam ball pellet.

7. The starting circuit as set forth in claim 3, wherein the second end of the extended wire connection is secured to a third segment, the extended wire connection also passing by another segment.

8. The starting circuit as set forth in claim 3, wherein the two ends of the extended wire connection are located on segments which are separated by approximately one-half of a distance along the voltage breakdown path within the lamp unit.

9. The starting circuit as set forth in claim 8, wherein the lamp unit includes eight segments.

10. A sealed lamp unit for a fluorescent lamp system, the sealed lamp unit comprising:
first and second lamp electrodes extending into the sealed lamp unit, the sealed lamp unit containing a gas which breaks-down when an electrical voltage potential is created within the sealed lamp unit, the sealed lamp unit being coated with a material which fluoresces when the gas within the sealed lamp unit breaks-down; and
an extended wire connection having a first end electrically connected to one of the first and second lamp electrodes and a termination end located such that a breakdown voltage path within the lamp unit is modified by the extended wire connection.

11. The sealed lamp unit as set forth in claim 10, wherein:
the sealed lamp unit is substantially circular and includes a plurality of segments;
the first and second lamp electrodes are located in first and second segments of the sealed lamp unit, the first and second segments being adjacent to one another; and
the termination end is located near a third segment.

12. The sealed lamp unit as set forth in claim 11, wherein the sealed lamp unit includes eight segments.

13. The sealed lamp unit as set forth in claim 11, wherein the two ends of the extended wire connection are located near segments which are separated by approximately one-half of a distance along the voltage breakdown path within the lamp unit.

14. The sealed lamp unit as set forth in claim 11, further including:
an amalgam ball pellet positioned in the third segment of the sealed lamp unit.

15. The sealed lamp unit as set forth in claim 11, wherein the extended wire connection passes by a fourth segment.

16. A compact fluorescent lamp system, comprising:
a housing;
an external base connector mounted in the housing, the external base connector receiving electrical power from an external source;
a ballast unit secured within the housing and electrically connected to the external base connector, the ballast unit controlling the electrical power received from the external source; and
a lamp unit, including:
first and second lamp electrodes extending into the lamp unit, the lamp unit containing a gas which breaks-down permitting electrical current to pass through the lamp unit, an interior of the lamp unit being coated with a material which fluoresces when the gas within the sealed lamp unit ionizes; and
an extended wire connection having a first end electrically connected to one of the first and second lamp electrodes and a termination end located near another point on the lamp unit, a breakdown voltage path within the lamp unit being modified by the extended wire connection.

17. The compact fluorescent lamp as set forth in claim 16, wherein the lamp unit is substantially circular and includes a plurality of segments, the first and second lamp electrodes being located in first and second segments of the sealed lamp unit, the first and second segments being adjacent to each another.

18. The compact fluorescent lamp as set forth in claim 17, wherein:
the ballast unit is an electronic ballast unit operating at a frequency above about 20 kHz.

19. The compact fluorescent lamp as set forth in claim 18, wherein the lamp unit is an integral type lamp unit.

20. The compact fluorescent lamp system as set forth in claim 18, wherein the lamp unit is a plug-in type lamp unit.

* * * * *